US006075689A

United States Patent [19]

Mitchell

[11] Patent Number: 6,075,689

[45] Date of Patent: Jun. 13, 2000

[54] DEVICE AND METHOD FOR PROTECTION OF HEATING VENTILATION AND AIR CONDITIONING CONTROL CIRCUITS FROM OVERCURRENTS

[76] Inventor: Dennis Mitchell, 12127 Jones Maltsberger Rd., San Antonio, Tex. 79316

[21] Appl. No.: 09/138,253

[22] Filed: Aug. 21, 1998

[51] Int. Cl.[7] .......... H02H 5/04

[52] U.S. Cl. .......... 361/106

[58] Field of Search .......... 361/57, 58, 87, 361/103, 105, 106, 111, 118, 119, 124, 126, 127; 307/117, 132 T; 337/112, 113, 264, 260

[56] References Cited

U.S. PATENT DOCUMENTS

| | | | |
|---|---|---|---|
| 3,152,259 | 10/1964 | Heine | 290/50 |
| 4,371,910 | 2/1983 | Bube et al. | 361/106 |
| 4,670,729 | 6/1987 | Oh | 337/264 |
| 4,682,140 | 7/1987 | Diaz-Noriega | 337/260 |
| 4,782,240 | 11/1988 | Davidson | 307/10 BP |
| 5,543,705 | 8/1996 | Uezono et al. | 323/369 |
| 5,590,011 | 12/1996 | Hein | 361/106 |
| 5,606,483 | 2/1997 | Sawai et al. | 361/106 |
| 5,645,746 | 7/1997 | Walsh | 219/505 |

*Primary Examiner*—Ronald W. Leja
*Attorney, Agent, or Firm*—Royston, Rayzor, Vickery, Novak & Druce, L.L.P.

[57] ABSTRACT

A device and method for protection of heating, ventilation, and air conditioning (HVAC) control circuits. The device includes a positive temperature coefficient (PTC) member which is a multi-use, non-bulky, element which will reset after tripping without requiring the user to access the device. The device also includes a pair of connective members to provide the external electrical interface for the device, such that the PTC member is disposed between and in electrical contact with the connective members. Each embodiment also includes a protective member covering portions of the PTC member and connective members chosen or formed sufficient to insulate a user from contact with electrical hazard and sufficient to protect the device from electrical and physical contact which would affect its performance or the performance of the HVAC control circuit to be protected. In alternative embodiments the connective members are configured as either a pair of parallel coplanar blades electrically and mechanically compatible with common blade-type fuse receptacles found in HVAC control circuits, a pair of insulated lead wires of sufficient length to allow a tradesman skilled in the art to splice the circuit protection device into an HVAC control circuit to be protected. In a further alternative embodiment of the present invention, the connective members and the protective member are collectively configured electrically and mechanically compatible with common screw-type fuse receptacles found in HVAC control circuits. The invention also includes three methods for protecting an HVAC control circuit from overcurrents. These methods generally consist of the steps of (1) providing a circuit protection device of the present invention and (2) installing the device in the circuit to be protected in a fashion appropriate to its construction.

9 Claims, 4 Drawing Sheets

DEVICE AND METHOD FOR PROTECTION OF HEATING VENTILATION AND AIR CONDITIONING CONTROL CIRCUITS FROM OVERCURRENTS

FIELD OF THE INVENTION

This invention relates generally to overcurrent protection for electrical circuits. Specifically, this invention relates to positive temperature coefficient (PTC) overcurrent protection for heating, ventilation, and air conditioning (HVAC) control circuits.

BACKGROUND INFORMATION

Circuit protection devices in HVAC control applications are well known. HVAC control circuits contain elements which may be harmed by overcurrents. Conventional fuses were developed to protect such elements by creating an open circuit in response to an overcurrent, but suffer from the drawback of being single-use devices. Once an open circuit is created in the fuse element, the fuse must be replaced. This deficiency was addressed with the invention of conventional circuit breakers. However, circuit breakers typically must be manually reset after "tripping"; where "tripping" is defined as creating an open circuit or limiting the current in the circuit to a minimal, non-damaging value. Both fuses and circuit breakers are oftentimes located in places which are difficult or dangerous for service personnel to access. Additionally, circuit breakers are prone to failure modes typically associated with mechanical devices. Further, circuit breakers are typically bulky items compared to fuses.

PTC materials, specifically polymer-based PTC materials, exhibit characteristics which offer advantages over both conventional fuses and circuit breakers. PTC materials behave such that a steady state trip current, $I_{trip}$, through PTC material which will cause the material to "trip" can be chosen to be less than the maximum current carrying capacity, $I_{max}$, of an HVAC control circuit to be protected and greater than a combined load current, $I_{load}$, drawn by all loads in the HVAC control circuit; where $I_{max}$ is greater than $I_{load}$. Similar characteristics can generally be found in both fuses and circuit breakers.

Upon encountering a current greater than $I_{trip}$, the resistance of PTC material increases to limit current to a steady-state value that can be chosen to be substantially lower than $I_{trip}$, $I_{load}$, or $I_{max}$. Unlike fuses or circuit breakers, removal of conditions which caused the PTC material to "trip" causes the material to return to a state allowing currents up to $I_{trip}$ to be conducted. Unlike fuse material, PTC material may be reused. Unlike circuit breakers, a PTC material-based device does not require service personnel or the user to access the device to reset it. PTC materials sufficient to provide overcurrent protection in HVAC control circuits are typically much less bulky than comparable circuit breakers. Current state of the art includes PTC materials which have a voltage rating commensurate with that required by HVAC control circuits.

Therefore, in view of the need for multi-use, non-bulky, HVAC control circuit overcurrent protection which can be reset without the user having access to the device and the potential benefits to be enjoyed in addressing the drawbacks of conventional circuit protection devices used in HVAC control circuits, the present invention has been designed and developed.

SUMMARY OF THE INVENTION

The present invention includes features and components that have been invented and selected for their individual and combined benefits and superior performance. The invention includes a circuit protection device for protecting an HVAC control circuits from overcurrents and methods for employing the circuit protection device.

Each of the several embodiments of the invention described herein includes a PTC member. In addition, each of several embodiments described herein includes a pair of connective members, arranged so that the PTC member is disposed therebetween and in electrical contact therewith. The connective members provide the necessary external electrical interface for the circuit protection device. Each embodiment also includes a protective member covering portions of the PTC member and the connective members. The protective member is chosen or constructed to insulate a user from contact with electrical hazard when the circuit protection device is installed. The same protective member is also designed to shield the circuit protection device from electrical and physical contact which would affect its performance or the performance of the HVAC control circuit within which it is included.

In one alternative embodiment, the connective members are configured as a pair of substantially parallel coplanar blades electrically and mechanically compatible with common blade-type fuse receptacles found in HVAC control circuits. In a further alternative embodiment, the connective members are configured as a pair of end caps at opposite ends of an insulating protective member to be electrically and mechanically compatible with common cartridge-type fuse receptacles commonly found in HVAC control circuits. In yet another alternative embodiment, the invention includes connective members configured as a pair of insulated lead wires of sufficient length to allow a tradesman skilled in the art to splice the circuit protection device into an HVAC control circuit to be protected. In yet another alternative embodiment of the present invention, the connective members and the protective member are collectively configured to be electrically and mechanically compatible with common screw-type fuse receptacles found in HVAC control circuits.

The invention also includes four methods for protecting an HVAC control circuit from overcurrents. These methods generally consist of the steps of (1) providing a circuit protection device of the present invention and (2) installing the device in the circuit to be protected in a fashion appropriate to its construction.

DESCRIPTION OF THE DRAWINGS AND ILLUSTRATIVE PHOTOGRAPHS

DESCRIPTION OF THE INVENTION

Based on the description and illustrations provided herein, the many benefits provided by the invented structure and methods of utilization are apparent. These described benefits, as well as those that are inherent to those skilled in the art, fall within the scope of the invention of the present patent application as limited only by the claims appended hereto.

Referring to FIGS. 1–9, each alternative embodiment of the HVAC control circuit protection device 100, 200, 300, 400 consists of a PTC member 110, 210, 310, 410; a pair of connective members 120, 130, 220, 230, 320, 330, 420, 430 and a protective member 140, 240, 340, 440. In each embodiment of the device 100, 200, 300, 400 described herein, the PTC member 110, 210, 310, 410 is radially leaded and disposed electrically between pairs of connective members 120 & 130, 220 & 230, 320 & 330, 420 & 430. Further, in each embodiment of the device 100, 200, 300, 400 described herein, the protective member 140, 240, 340, 440 serves to protect a user from contact with electrical hazard when the device 100, 200, 300, 400 is installed and to protect the device 100, 200, 300, 400 from electrical and mechanical hazard which would affect its performance or the performance of the HVAC control circuit to be protected.

Figure 1:
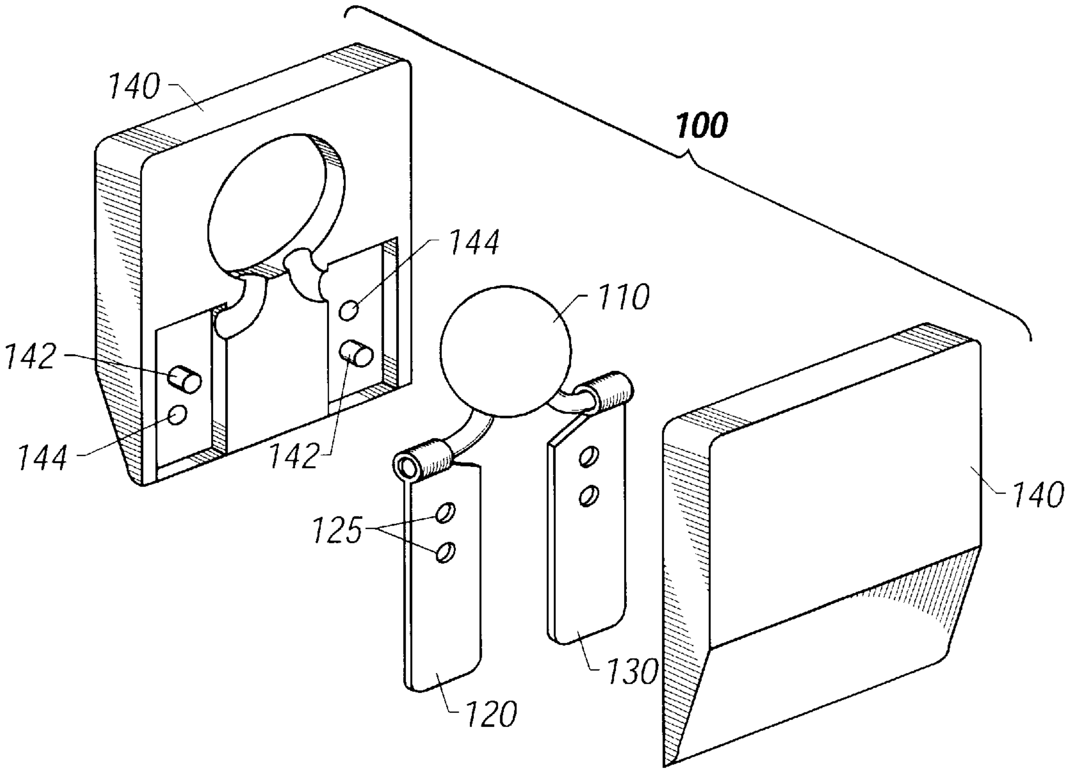
FIG. 1 is an exploded perspective view of a preferred embodiment of the present invention configured to be electrically and mechanically compatible with common blade-type fuse receptacles found in HVAC control circuits.
Figure 2:
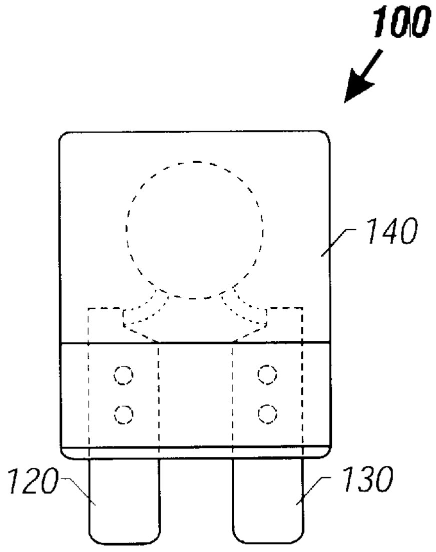
FIG. 2 is a front elevational view of a preferred embodiment of the present invention configured to be electrically and mechanically compatible with common blade-type fuse receptacles found in HVAC control circuits.
Figure 3:
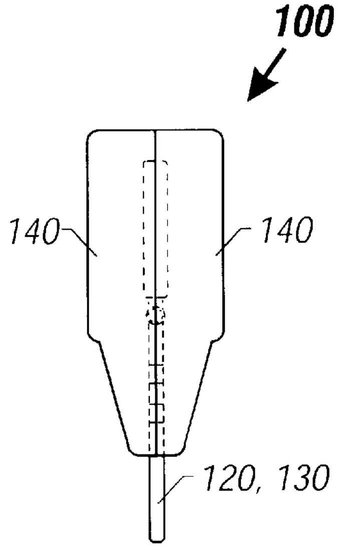
FIG. 3 is a side elevational view of a preferred embodiment of the present invention configured to be electrically and mechanically compatible with common blade-type fuse receptacles found in HVAC control circuits.

Referring to FIGS. 1–3, a preferred embodiment of the HVAC control circuit protection device 100 is shown. Here, the PTC member 110 is disposed electrically between a pair of substantially co-planar and substantially parallel connective members 120, 130. The connective members 120, 130 provide the external electrical interface of the HVAC control circuit protection device 100 and are formed and arranged to be electrically and mechanically compatible with blade-type fuse receptacles commonly found in HVAC control circuits. The non-conductive protective member 140 of this embodiment is formed by two substantially similar halves which are joined to substantially cover the PTC member 110 and partially cover the connective members 120, 130. In addition, the protective member 140 contributes to the structural integrity of the device 100 through a plurality of posts 142 and recesses 144 which mate through a plurality of holes 125 in the connective members 120, 130.

Figure 4:
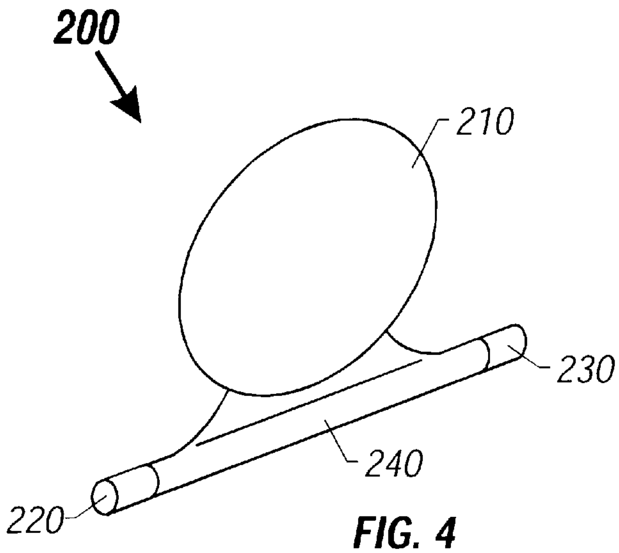
FIG. 4 is a perspective view of an alternative embodiment of the present invention configured to be electrically and mechanically compatible with common cartridge-type fuse receptacles found in HVAC control circuits.
Figure 5:
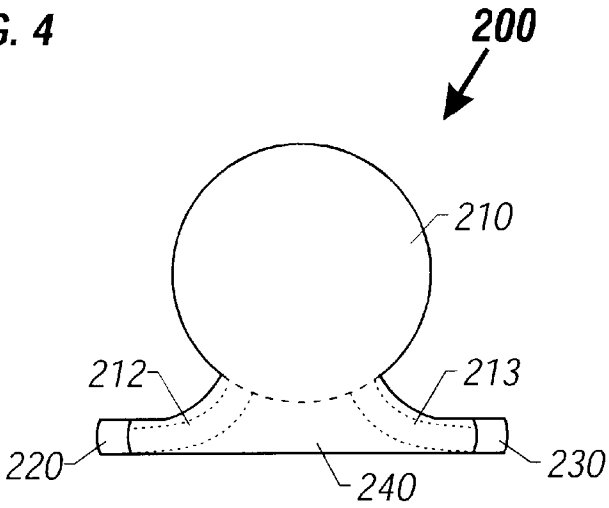
FIG. 5 is a front elevational view of an alternative embodiment of the present invention configured to be electrically and mechanically compatible with common cartridge-type fuse receptacles found in HVAC control circuits.
Figure 6:
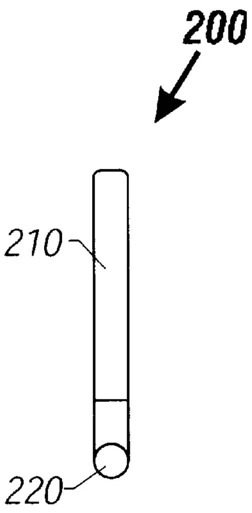
FIG. 6 is a side elevational view of an alternative embodiment of the present invention configured to be electrically and mechanically compatible with common cartridge-type fuse receptacles found in HVAC control circuits.

Referring to FIGS. 4–6, an alternative embodiment of the present invention is shown. In this embodiment, the connective members 220, 230 are conductive end caps disposed at opposite ends of a nonconductive protective member 240. The non-conductive protective member 240 substantially covers the PTC member's 210 conductive leads 212, 213 which connect electrically to the end caps 220, 230. The entire device 200 is electrically and mechanically compatible with cartridge-type fuse receptacles commonly found in HVAC control circuits.

Figure 8:
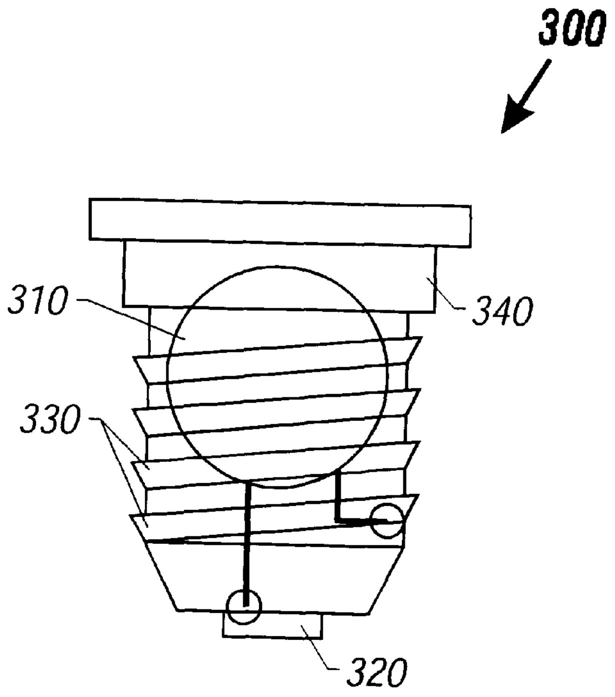
FIG. 8 is an elevational view of an alternative embodiment of the present invention configured to be electrically and mechanically compatible with common screw-type fuse receptacles found in HVAC control circuits.
Figure 7:
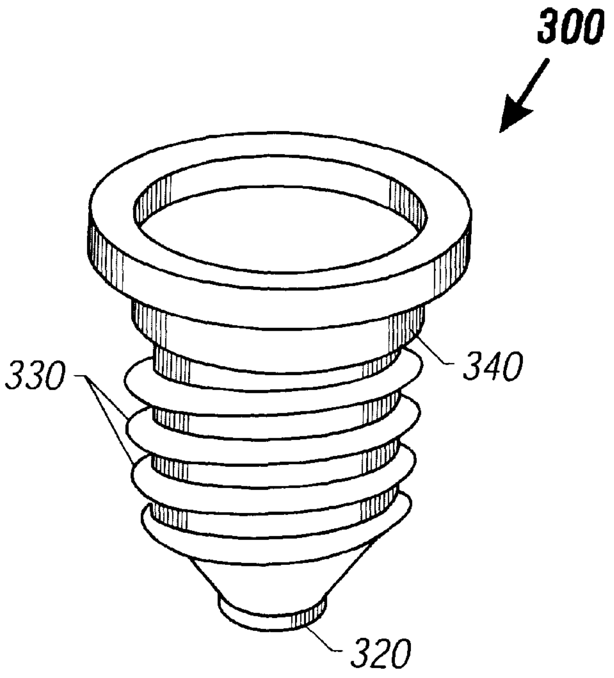
FIG. 7 is a perspective view of an alternative embodiment of the present invention configured to be electrically and mechanically compatible with common screw-type fuse receptacles found in HVAC control circuits.

Referring to FIGS. 7 and 8, a further alternative embodiment of the present invention is shown. In this embodiment, one connective member 320 is formed and disposed as the base of a screw-type circuit protection device commonly found in HVAC control circuits. The other connective member 330 is formed and disposed as the threads of such a screw-type circuit protection device. The non-conductive protective member 340 of the device 300 covers the PTC member 310 and supports and electrically isolates the connective members 320, 330. The entire device 300 is electrically and mechanically compatible with screw-type fuse receptacles commonly used in HVAC control circuits.

Figure 9:
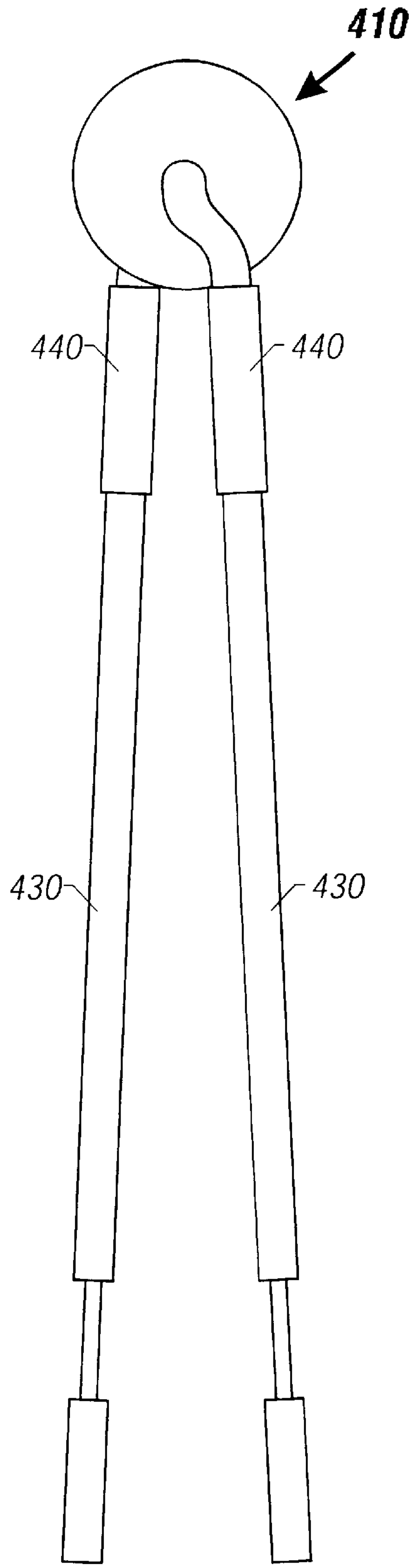
FIG. 9 is an elevational view of an alternative embodiment of the present invention where the connective members are insulated wires of sufficient length to allow a tradesman skilled in the art to splice the circuit protection device into an HVAC control circuit.

Referring to FIG. 9, a further alternative embodiment of the present invention is shown. In this embodiment of the device 400, each of the connective members 420, 430 is an insulated conductor of sufficient length to allow a tradesman skilled in the art to splice the device 400 into an HVAC control circuit. The protective member 440 is configured as insulating heat shrink tubing or electrical tape to cover the PTC member's leads and the junction between the PTC member 410 and the connective members 420, 430.

What is claimed and desired to be secured by Letters Patent is as follows:

1. A circuit protection device for protecting an heating, ventilation, and air conditioning (HVAC) control circuit from overcurrents, said device comprising:
   - a positive temperature coefficient (PTC) member, said PTC member configured for installation in an HVAC control circuit and adapted so:
     - a steady state trip current, $I_{trip}$, through said PTC member which will cause said PTC member to trip is less than a maximum current carrying capacity, $I_{max}$, of an HVAC control circuit to be protected and is greater than a combined load current, $I_{load}$, drawn by all loads in said HVAC control circuit to be protected during normal operation;
     - the resistance of said PTC member increases upon tripping to limit current in said HVAC control circuit to be protected to a steady state value substantially lower than $I_{trip}$, $I_{load}$, and $I_{max}$;
     - said PTC member returns to a state allowing $I_{load}$ to be conducted in said HVAC control circuit to be protected upon removal of conditions which caused said PTC member to trip; and
     - said PTC member has a voltage rating commensurate with other elements in the HVAC control circuit to be protected;
   - a pair of connective members configured so that said PTC member is disposed between and in electrical contact with said connective members, so that said connective members provide an external electrical interface for said circuit protection device; and
   - a protective member at least partially covering said PTC member and said connective members, said protective member adapted to insulate a user from contact with electrical hazard when said circuit protection device is installed in an HVAC control circuit to be protected thereby and to protect said circuit protection device from performance-affecting electrical and physical contact during use.

2. The invention as recited in claim 1 wherein said connective members are configured as a pair of parallel coplanar blades electrically and mechanically compatible with a blade-type fuse receptacles of an HVAC control circuit.

3. The invention as recited in claim 1 said wherein said connective members comprise a pair of insulated lead wires of sufficient length to allow a tradesman skilled in the art to splice said circuit protection device into an HVAC control circuit to be protected.

4. The invention as recited in claim 1, wherein said connective members and said protective member are configured to be electrically and mechanically compatible with a screw-type fuse receptacle of an HVAC control circuit.

5. The invention as recited in claim 1, wherein said connective members and said protective member are configured to be electrically and mechanically compatible with a cartridge-type fuse receptacle of an HVAC control circuit.

6. A method for protecting a heating, ventilation, and air conditioning (HVAC) control circuit from overcurrents comprising the steps of:

providing a circuit protection device for protecting an HVAC control circuit from overcurrents, said device comprising:

a positive temperature coefficient (PTC) member, said PTC member configured for installation in an HVAC control circuit and adapted so:

a steady state trip current, $I_{trip}$, through said PTC member which will cause said PTC member to trip is less than a maximum current carrying capacity, $I_{max}$, of an HVAC control circuit to be protected and is greater than a combined load current, $I_{load}$, drawn by all loads in said HVAC control circuit to be protected during normal operation;

the resistance of said PTC member increases upon tripping to limit current in said HVAC control circuit to be protected to a steady state value substantially lower than $I_{trip}$, $I_{load}$, and $I_{max}$;

said PTC member returns to a state allowing $I_{load}$ to be conducted in said HVAC control circuit to be protected upon removal of conditions which caused said PTC member to trip; and said PTC member has a voltage rating commensurate with other elements in the HVAC control circuit to be protected;

a pair of connective members configured so that said PTC member is disposed between and in electrical contact with said connective members, so that said connective members provide an external electrical interface for said circuit protection device, said connective members configured as a pair of parallel coplanar blades electrically and mechanically compatible with common blade-type fuse receptacles found in HVAC control circuits, a protective member at least partially covering said PTC member and said connective members, said protective member adapted to insulate a user from contact with electrical hazard when said circuit protection device is installed in an HVAC control circuit to be protected thereby and to protect said circuit protection device from performance-affecting electrical and physical contact during use, removing any existing overcurrent protection device from a blade-type fuse receptacle of said HVAC control circuit to be protected, inserting the said circuit protection device into said blade-type fuse receptacle of said HVAC control circuit thereby protecting said HVAC control circuit from overcurrent conditions.

7. A method for protecting a heating, ventilation, and air conditioning (HVAC) control circuit from overcurrents comprising the steps of:

providing a circuit protection device for protecting an HVAC control circuit from overcurrents, said device comprising:

a positive temperature coefficient (PTC) member, said PTC member configured for installation in an HVAC control circuit and adapted so:

a steady state trip current, $I_{trip}$, through said PTC member which will cause said PTC member to trip is less than a maximum current carrying capacity, $I_{max}$, of an HVAC control circuit to be protected and is greater than a combined load current, $I_{load}$, drawn by all loads in said HVAC control circuit to be protected during normal operation;

the resistance of said PTC member increases upon tripping to limit current in said HVAC control circuit to be protected to a steady state value substantially lower than $I_{trip}$, $I_{load}$, and $I_{max}$;

said PTC member returns to a state allowing $I_{load}$ to be conducted in said HVAC control circuit to be protected upon removal of conditions which caused said PTC member to trip; and said PTC member has a voltage rating commensurate with other elements in the HVAC control circuit to be protected;

a pair of connective members configured so that said PTC member is disposed between and in electrical contact with said connective members, so that said connective members provide an external electrical interface for said circuit protection device, said connective members comprise a pair of insulated lead wires of sufficient length to allow a tradesman skilled in the art to splice said circuit protection device into an HVAC control circuit to be protected, a protective member at least partially covering said PTC member and said connective members, said protective member adapted to insulate a user from contact with electrical hazard when said circuit protection device is installed in an HVAC control circuit to be protected thereby and to protect said circuit protection device from performance-affecting electrical and physical contact during use, splicing said circuit protection device into a circuit to be protected, said circuit protection device spliced in series with an electrical power source of the circuit to be protected and an impedance representative of the cumulative load of the circuit to be protected.

8. A method for protecting a heating, ventilation, and air conditioning (HVAC) control circuit from overcurrents comprising the steps of:

providing a circuit protection device for protecting an HVAC control circuit from overcurrents, said device comprising:

a positive temperature coefficient (PTC) member, said PTC member configured for installation in an HVAC control circuit and adapted so:

a steady state trip current, $I_{trip}$, through said PTC member which will cause said PTC member to trip is less than a maximum current carrying capacity, $I_{max}$, of an HVAC control circuit to be protected and is greater than a combined load current, $I_{load}$, drawn by all loads in said HVAC control circuit to be protected during normal operation;

the resistance of said PTC member increases upon tripping to limit current in said HVAC control circuit to be protected to a steady state value substantially lower than $I_{trip}$, $I_{load}$, and $I_{max}$;

said PTC member returns to a state allowing $I_{load}$ to be conducted in said HVAC control circuit to be protected upon removal of conditions which caused said PTC member to trip; and said PTC member has a voltage rating commensurate with other elements in the HVAC control circuit to be protected;

a pair of connective members configured so that said PTC member is disposed between and in electrical contact with said connective members, so that said connective members provide an external electrical interface for said circuit protection device, a protective member at least partially covering said PTC member and said connective members, said protective member adapted to insulate a user from contact with electrical hazard when said circuit protection device is installed in an HVAC control circuit to be protected thereby and to protect said circuit protection device from performance-affecting electrical and physical contact during use, said connective members and said protective member are configured electrically and mechanically compatible with common screw-type fuse receptacles found in HVAC control circuits, removing any existing overcurrent protection device from a screw-type fuse receptacle of said HVAC control circuit to be protected, screwing the said circuit protection device into the screw-type fuse receptacle of said HVAC control circuit thereby protecting said HVAC control circuit from overcurrent conditions.

9. A method for protecting a heating, ventilation, and air conditioning (HVAC) control circuit from overcurrents comprising the steps of:

providing a circuit protection device for protecting an HVAC control circuit from overcurrents, said device comprising:

a positive temperature coefficient (PTC) member, said PTC member configured for installation in an HVAC control circuit and adapted so:

a steady state trip current, $I_{trip}$, through said PTC member which will cause said PTC member to trip is less than a maximum current carrying capacity, $I_{max}$, of an HVAC control circuit to be protected and is greater than a combined load current, $I_{load}$, drawn by all loads in said HVAC control circuit to be protected during normal operation;

the resistance of said PTC member increases upon tripping to limit current in said HVAC control circuit to be protected to a steady state value substantially lower than $I_{trip}$, $I_{load}$, and $I_{max}$;

said PTC member returns to a state allowing $I_{load}$ to be conducted in said HVAC control circuit to be protected upon removal of conditions which caused said PTC member to trip; and said PTC member has a voltage rating commensurate with other elements in the HVAC control circuit to be protected;

a pair of connective members configured so that said PTC member is disposed between and in electrical contact with said connective members, so that said connective members provide an external electrical interface for said circuit protection device, a protective member at least partially covering said PTC member and said connective members, said protective member adapted to insulate a user from contact with electrical hazard when said circuit protection device is installed in an HVAC control circuit to be protected thereby and to protect said circuit protection device from performance-affecting electrical and physical contact during use, said connective members and said protective member are configured to be electrically and mechanically compatible with a cartridge-type fuse receptacles of said HVAC control circuit to be protected, removing any existing overcurrent protection device from a cartridge-type fuse receptacle of said HVAC control circuit to be protected, inserting said circuit protection device into said cartridge-type fuse receptacle of said HVAC control circuit thereby protecting said HVAC control circuit from overcurrent conditions.

* * * * *